United States Patent [19]
Nyenya

[11] Patent Number: 5,278,771
[45] Date of Patent: Jan. 11, 1994

[54] PROGRAMMABLE TIMED ELECTRICAL POWER MANAGEMENT DEVICE

[75] Inventor: Seth S. Nyenya, Houston, Tex.

[73] Assignee: Seti Corporation, Houston, Tex.

[21] Appl. No.: 729,368

[22] Filed: Jul. 12, 1991

[51] Int. Cl.$^5$ .............................................. H02J 3/14
[52] U.S. Cl. ...................................... 364/492; 307/38
[58] Field of Search ...................... 364/481, 483, 492; 307/38, 39

[56] References Cited

U.S. PATENT DOCUMENTS

| | | | |
|---|---|---|---|
| 4,125,782 | 11/1978 | Pollnow, Jr. | 307/38 |
| 4,562,550 | 12/1985 | Beatty et al. | 307/39 |
| 4,964,058 | 10/1990 | Brown, Jr. | 364/492 |
| 4,996,646 | 2/1991 | Farrington | 364/492 |
| 4,998,024 | 3/1991 | Kirk et al. | 307/38 |

Primary Examiner—Jack B. Harvey
Assistant Examiner—Thomas Peeso
Attorney, Agent, or Firm—Kenneth A. Roddy

[57] ABSTRACT

A programmable timed electrical power management device protects and controls electrical equipment and peripherals which are plugged into it. The front of the housing containing the electrical circuitry is provided with a LCD display, a series of pressure sensitive switches for inputting function and control commands to control the operation of the device. A series of LED's mounted on the front of the housing indicate the operational status of the device. The back of the housing is provided with an AC power input receptacle, an on/off reset switch, a series of AC outlets which are divided into pairs of filtered banks, and two or more modular jacks for receiving the modular plug of a telephone, fax, and/or modem. The device circuitry includes a CPU, timer/calendar, a sound generator, voltage sensors, and a back-up battery power supply. The outlets and modular plugs are protected from electrical surges. Each bank of outlets can be selectively programmed to turn on and off at a different time of the day and different days of the week. When more than one bank is set to start at the same time, power is sequentially supplied to each electrical outlet bank allowing the voltage to stabilize before turning on the next bank. A warning tone will sound fifteen, ten, and five minutes prior to shutting off any of the banks, to alert the user that the system is approaching the preset time for the power to the outlets to be turned off, to prevent accidental loss of information.

17 Claims, 4 Drawing Sheets

| SET TIME | SUN | HH:MM  AM |
|---|---|---|
| F1 | F2 ⌃ | F3 --→ |

FIG. 6

| BANK A START TIME | S M T W T F S | HH:MM  AM |
|---|---|---|
| F1 | F2 ⌃ | F3 ----→ |

FIG. 7

| BANK A STOP TIME | ⌃ | HH:MM  AM |
|---|---|---|
| F1 | F2 | F3 -----→ |

FIG. 8

| SET 1    MYZA  M-610 | HH:MM AM    120 V |
|---|---|

FIG. 9

PROGRAMMABLE TIMED ELECTRICAL POWER MANAGEMENT DEVICE

BACKGROUND OF THE INVENTION

1. Field of the Invention

This invention relates generally to the protection of electrical equipment, and more particularly to a programmable timed electrical power management device for protecting and controlling electrical equipment plugged into it.

2. Brief Description of the Prior Art

Conventional surge protectors are used with computer equipment to prevent them from becoming damaged in the event of a power surge. Most often, they have a plurality of electrical receptacles into which a computer and various other peripheral devices, such as printers, monitors, modems, etc. are plugged. A control switch allows all the devices to be turned on or off at the same time.

In large business establishments having their computer systems plugged into surge protectors, the workers will usually turn on their computer systems at the start of their work day at about the same time, say 8:00 AM, which will often result in tripping the circuit breaker in the building.

There are several patents which disclose various surge protection devices for electronic equipment.

Fussell, U.S. Pat. No. 4,023,071 discloses a transient and surge protection apparatus for absorbing and dissipating the electrical energy present in voltage transients and surges. The device limits the peak voltage of a surge to a safe value and dissipates the surge energy to prevent damage to the power distribution system and associated equipment.

Zulaski, U.S. Pat. No. 4,104,687 discloses device for detecting unbalanced conditions in a polyphase equipment bank. The device detects capacitor unit failures in a multi-phase grounded wye-connected capacitor bank in a high voltage transmission system.

Stifter, U.S. Pat. No. 4,259,705 discloses a combination surge protector filter having a plurality of electrical sockets having a filter connected between each socket and the suppressor which provide electrical isolation between electronic equipment connected to the individual sockets and isolation from AC power line noise and transients.

Speet et al, U.S. Pat. No. 4,703,386 discloses a power receptacle for use in a modular office panel power supply system which has a plurality outlets at least one of which can be selectively electrically isolated from the remaining outlets for filtering the isolated outlet. In one embodiment, the system includes a line conditioner having a cam which, when mechanically and electrically coupled to the receptacle, couples a surge protection circuit in parallel with each of the outlets of the receptacle and a line conditioning filter only in series with the isolated outlet for supplying power to a computer.

Austin, U.S. Pat. No. 4,807,083 discloses a voltage surge suppressor for connecting electronic equipment to AC power and coaxial antenna lines. The apparatus includes two surge suppression circuits within a single housing, one for the coaxial antenna line and the other for the AC power line.

The present invention is distinguished over the prior art in general, and these patents in particular by a programmable timed electrical power management device that protects and controls electrical equipment and peripherals which are plugged into it. The front of the housing containing the electrical circuitry is provided with a LCD display, a series of pressure sensitive switches for inputting function and control commands to control the operation of the device. A series of LED's mounted on the front of the housing indicate the operational status of the device. The back of the housing is provided with an AC power input receptacle, an on/off reset switch, a series of AC outlets which are divided into pairs of filtered banks, and two or more modular jacks for receiving the modular plug of a telephone, fax, and/or modem.

The device circuitry includes a CPU, timer/calendar, a sound generator, voltage sensors, and a back-up battery power supply. The outlets and modular plugs are protected from electrical surges. Each bank of outlets can be selectively programmed to turn on and off at a different time of the day and different days of the week. When more than one bank is set to start at the same time, power is sequentially supplied to each electrical outlet bank allowing the voltage to stabilize before turning on the next bank. A warning tone will sound fifteen, ten, and five minutes prior to shutting off any of the banks, to alert the user that the system is approaching the preset time for the power to the outlets to be turned off, to prevent accidental loss of information.

SUMMARY OF THE INVENTION

It is therefore an object of the present invention to provide a programmable timed electrical power management device which will protect and control electrical equipment and periprals which are plugged into it.

It is another object of this invention to provide a programmable timed electrical power management device which will allow a human operator to selectively program and control the operating time of electrical equipment and peripherals which are plugged into electrical outlets contained in its housing.

Another object of this invention is to provide a programmable timed electrical power management device which will allow sequential activation of electrical equipment and peripherals which are plugged into electrical outlets contained in its housing and allow the voltage to stabilize before turning on the next outlet.

Another object of this invention is to provide a programmable timed electrical power management device which has a liquid crystal visual display, a series of pressure sensitive switches for inputting function and control commands to control the operation of the device, and a series of light emitting diodes mounted on the front of the housing to indicate the operational status of the device.

Another object of this invention is to provide a programmable timed electrical power management device which has an AC power input receptacle, an on/off reset switch, a series of AC outlets which are divided into pairs of filtered banks, and two or more modular jacks for receiving the modular plug of a telephone, fax, and/or modem.

Another object of this invention is to provide a programmable timed electrical power management device which will allow a human operator to program the operation of electrical equipment and peripherals plugged into electrical outlets contained in its housing whereby the outlets can be selectively programmed to turn on and off at a different time of the day and different days of the week.

A further object of this invention is to provide a programmable timed electrical power management device which will sound a warning tone prior to shutting off power to equipment plugged into its outlets to alert the user that the system is approaching the preset time for the power to the outlets to be turned off and prevent accidental loss of information.

A still further object of this invention is to provide a programmable timed electrical power management device which is simple in construction, economical to manufacture, aesthetically pleasing, and reliable in operation.

Other objects of the invention will become apparent from time to time throughout the specification and claims as hereinafter related.

The above noted objects and other objects of the invention are accomplished by a programmable timed electrical power management device that protects and controls electrical equipment and peripherals which are plugged into it. The front of the housing containing the electrical circuitry is provided with a LCD display, a series of pressure sensitive switches for inputting function and control commands to control the operation of the device. A series of LED's mounted on the front of the housing indicate the operational status of the device. The back of the housing is provided with an AC power input receptacle, an on/off reset switch, a series of AC outlets which are divided into pairs of filtered banks, and two or more modular jacks for receiving the modular plug of a telephone, fax, and/or modem.

The device circuitry includes a CPU, timer/calendar, a sound generator, voltage sensors, and a back-up battery power supply. The outlets and modular plugs are protected from electrical surges. Each bank of outlets can be selectively programmed to turn on and off at a different time of the day and different days of the week. When more than one bank is set to start at the same time, power is sequentially supplied to each electrical outlet bank allowing the voltage to stabilize before turning on the next bank. A warning tone will sound fifteen, ten, and five minutes prior to shutting off any of the banks, to alert the user that the system is approaching the preset time for the power to the outlets to be turned off, to prevent accidental loss of information.

DESCRIPTION OF THE PREFERRED EMBODIMENT

Figure 1:
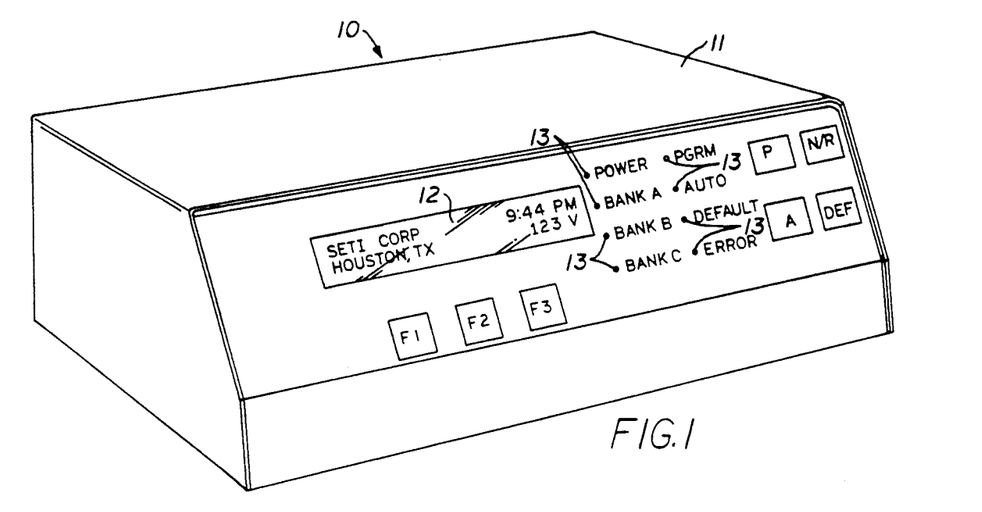
FIG. 1 is a perspective view of the front of the housing of the programmable timed electrical power management device in accordance with the present invention.
Figure 2:
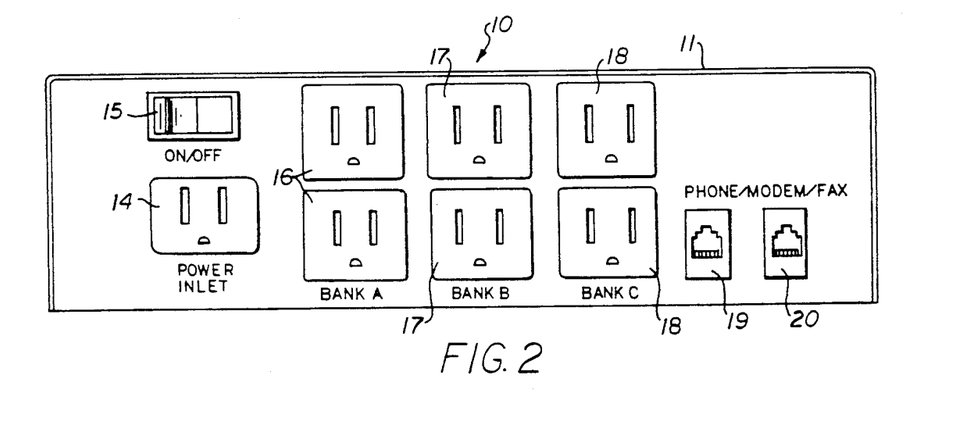
FIG. 2 is an elevation view of the rear of the housing of the programmable timed electrical power management device.

Referring to the drawings by numerals of reference, there is shown in FIGS. 1 and 2, a preferred programmable timed electrical power management device 10 particularly useful in protecting and controlling computer equipment and peripherals which are plugged into it. The electrical circuitry is contained in a box-like housing 11. The front of the housing 11 is provided with a LCD display 12. A series of three pressure sensitive switches F1, F2, and F3 are mounted beneath the display 12 and four pressure sensitive switches P, A, DEF, and N/R, are mounted on the right-hand side of the front of the housing 11 for inputting function and control commands to control the operation of the device. A series of LED's 13 are mounted on the front of the housing to indicate the operational status of the device.

As seen in FIG. 2, the back of the housing 11 is provided with an AC power input receptacle 14, an on/off reset switch 15, six AC outlets 16, 17, and 18 which are divided into three banks of two outlets each, and two or more RJ-11 modular jacks 19 and 20 for receiving the modular plug of a telephone, fax, and/or modem.

Figure 3:
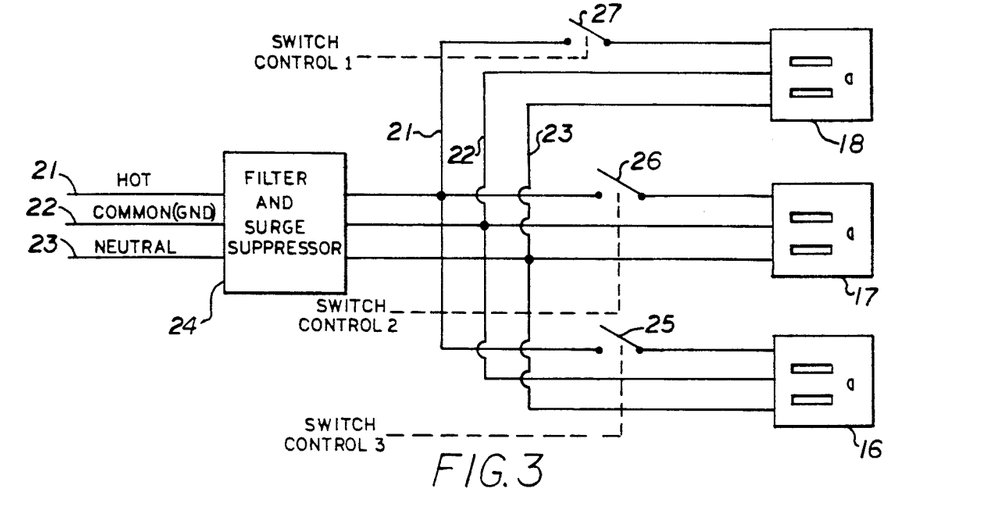
FIG. 3 is a schematic block diagram of the basic circuitry of the programmable timed electrical power management device.

Referring now to FIG. 3, the basic circuitry of the device 10 is shown in block diagram. The hot 21, common 22, and neutral 23 wires of the power input line are connected to a combination filter and surge suppressor 24. The output of the combination filter and surge suppressor 24 is fed to a plurality of pairs of electrical outlets 16, 17, and 18. The hot wire 21 is connected to each group of outlet openings through switches 25, 26, and 27. Additional groups of outlets may be added if desired. Each switch 25, 26, and 27, has a control which will be discussed below.

Figure 4:
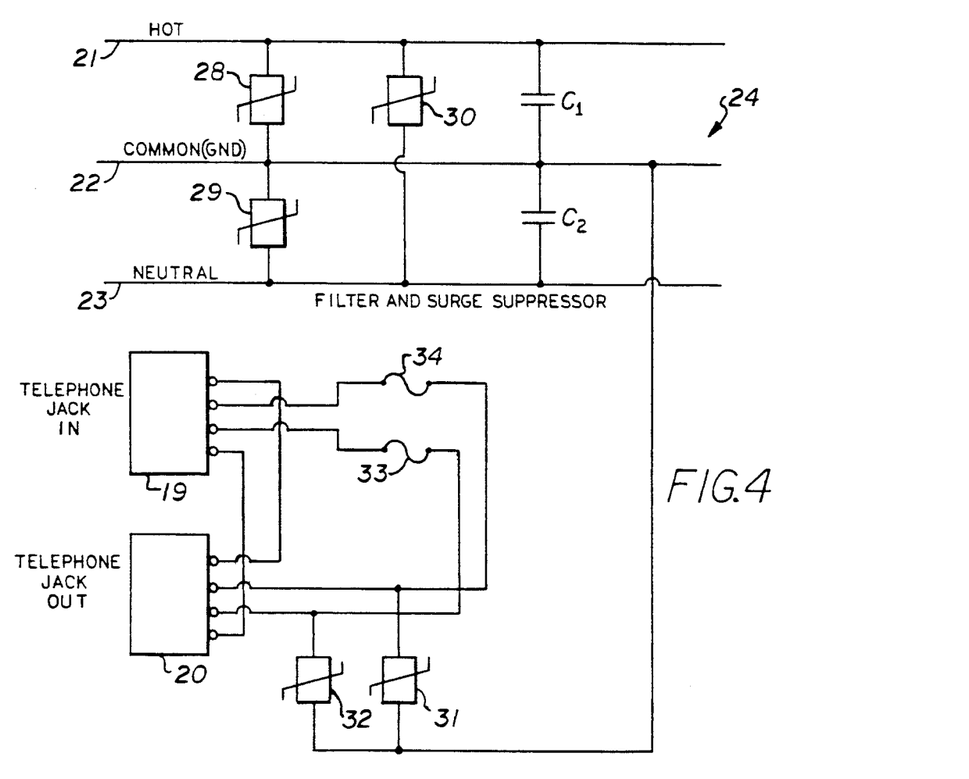
FIG. 4 is an electrical circuit diagram the combination filter and electrical power management device circuitry.

FIG. 4 shows the circuitry of the combination filter and surge suppressor 24. Varistors 28, 29, and 30 are connected in parallel across the three wires 21, 22, and 23 of the power line as surge suppressors to short circuit high frequency bursts to the common ground. The modular jacks 19 and 20 are coupled to the common ground 22 of the power line and are also protected from surges by varistors 31 and 32 and fuses 33 and 34.

Figure 5:
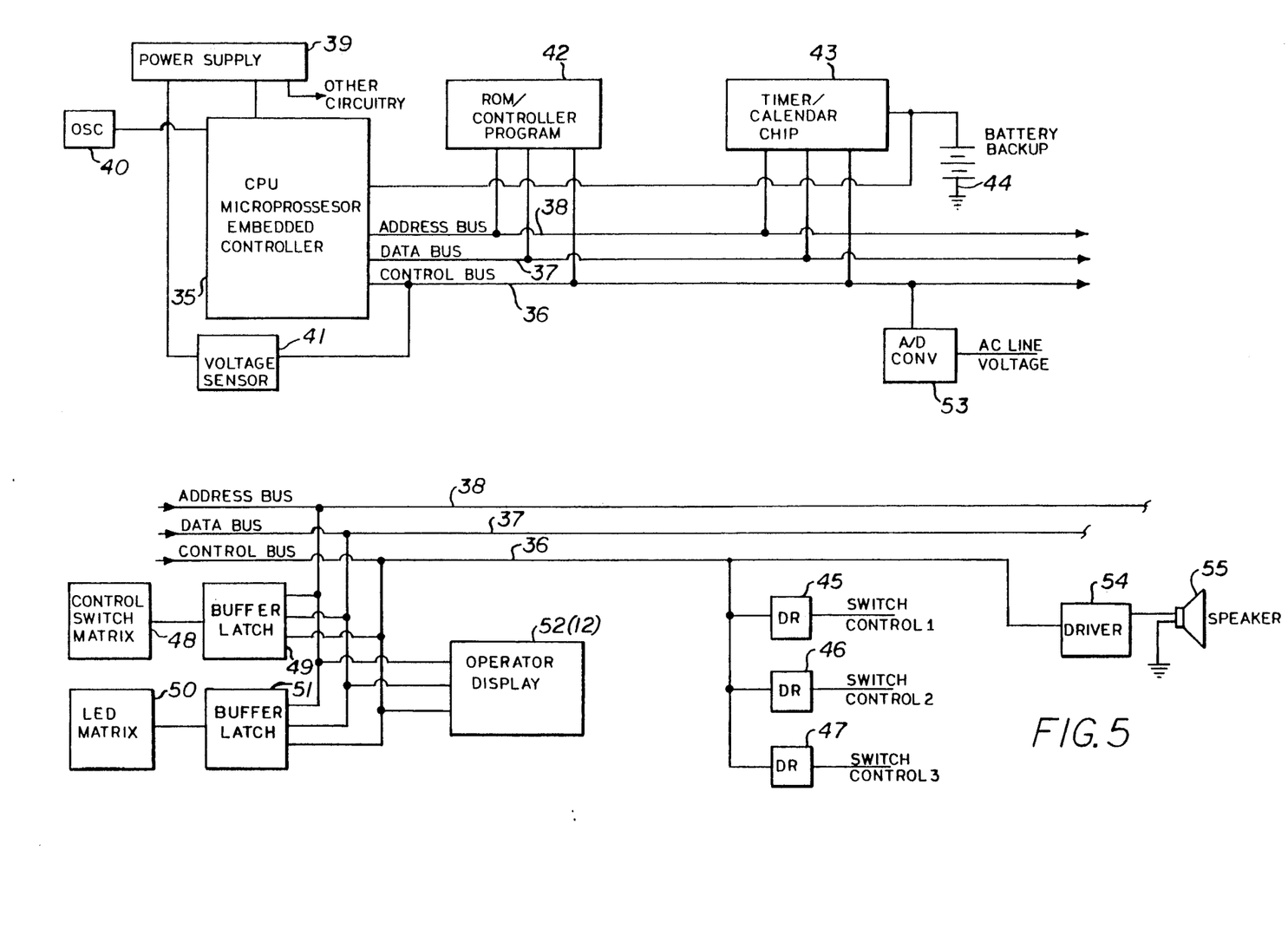
FIG. 5 is an electrical circuit diagram of the computer control system of the programmable timed electrical power management device.

The computer controls which provide for programming and control functions of the switches 25, 26, and 27 along with other components of the device are shown in FIG. 5. A microprocessor (embedded controller or CPU) 35 has one or more buses with I/0 ports connected to the devices to be controlled. Each device to be controlled has an address which can be called up by placing the bit combination of the address on the address bus lines. In the illustrated embodiment, there are three buses; the control bus 36, the data bus 37, and the address bus 38. A preferred chip controller is an Intel 8031, however other commercially available CPU chips may be used. Some commercially available chips may also have a shared address and data bus.

Still referring to FIG. 5, the power supply 39 supplies the required voltages to the various parts of the circuit. An oscillator 40 supplies the timing required by the CPU 35. Voltage sensor 41 monitors the power supply voltages. In the event of power failure, the voltage sensor 41 issues. An interrupt signal to the CPU 35 via the control bus 36. This interrupt signal causes the CPU 35 to stop what it is doing and initiate an orderly shutdown sequence before the power can completely fail. The CPU 35 is directed in its operation by a set of instructions or program contained in read-only memory or ROM 42. The ROM 42 and CPU 35 communicate via all three buses; the control bus 36, the data bus 37, and the address bus 38. A timer/calendar IC chip 43 is also connected with the three buses 36, 37, and 38. A auxiliary back-up battery 44 is connected to the CPU 35 and the timer/calendar 43 to maintain back-up power to the CPU and timer/calendar when the main power is off or unplugged. Once programmed, with the proper date and time, the information is not lost unless the battery goes dead or is changed.

One of the major functions of the present invention is to control the application of power to the electrical outlets 16, 17, and 18. Drivers 45, 46, and 47 are connected to the control bus 36 to affect turn-on of the switches 25, 26, and 27. Each group of the outlets can be selectively programmed to turn on and off at a different time of the day and different days of the week. These times are provided by the timer/calendar 43 which also keeps track of the date, month, and year. The timer/calendar IC chip 43 is addressed and controlled by the buses 36, 37, and 38. The set-up of the timer/calendar 43 is made by the human operator through the control switch matrix 48 on the front panel of the housing. The switch matrix 48 is connected to the three buses 36, 37, and 38 through a buffer latch 49. The switch matrix 48 also permits the programming of the switches 25, 26, and 27 such that the time of day and day of the week that power is desired may be made available at the electrical outlets 16, 17, and 18. The CPU 35 reads the contents of the buffer latch 49 and reacts according to the program stored in ROM 42.

A LED matrix 50 is connected to the three buses 36, 37, and 38 through a buffer latch 51. The CPU 35 is capable of writing to the buffer latch 51 which in turn drives the LED matrix 50 which gives the human operator a visual readout of the status of the system at a glance. The LCD display 12 is controlled by a video controller or display operator 52 to facilitate programming operations of the device by the human operator and in a preferred embodiment is a twenty-four character, two line display. The CPU 35 writes to the display operator 52 in the conventional manner and the generated characters are visually displayed on the LC display 12.

An IC analog-to-digital converter 53 is connected to the control bus 36 of the CPU 35 and reads the AC line voltage. The CPU 35 writes the value representing the voltage reading to the display operator 52 and the generated characters are also displayed on the LCD display 12 along with the other displayed information described above.

An audio power driver 54 connected to the control bus 36 drives a loudspeaker or piezo sound generator 55 to produce an audible feedback sound to the human operator. The sound generator 55 beeps each time a switch is pushed to indicate that the keystroke was accepted by the CPU 35. The sound generator 55 will also produce a warning signal fifteen, ten, and five minutes prior to shutting off any of the banks, to alert the user that the system is approaching the preset time for the power to the outlets to be turned off, to prevent accidental loss of information.

OPERATION

The purpose of the programmable timed electrical power management device is to control the on and off times of the electrical equipment plugged into the back of it. Up to six electrical devices can be plugged into the electrical outlets. The six outlets are divided into three separate banks that can be individually controlled (on/off). The device has three pressure sensitive switches (F1, F2, and F3) under the LCD display 12 and four on the right-hand side (P, A, DEF, and N/R). There are eight LED's 13 to indicate status of the system.

Referring again to FIGS. 1 and 2, the eight LED's on the front panel indicate status as follows: The LED adjacent the word "power" is green when the device is receiving utility power supply. The LED's adjacent "bank A", "bank B" and "bank C" indicate which of the electrical outlet banks (16, 17, or 18) are on. In the programming mode, they will indicate which bank is being programmed. The LED adjacent "pgrm" (program) is green or "on" in the program mode to set time and preset start/stop times. The LED adjacent "auto" is orange when indicating that the "auto" switch A has been pushed or activated. The LED adjacent "default" is orange when indicating that the factory set default start/stop times are being used. The LED adjacent "error" is constant red when there is a self-test error, and will flash when there is a set-up error.

The pressure sensitive switches are used for programming as follows: The "program" switch P allows the user to set the time of day, the day of the week, and program individual bank set-points. The "default" switch DEF allows the user to select the factory default settings for the on/off set-points. To use the default mode, the user must press the "default" switch DEF twice within a five-second interval. In the default mode, the "default" LED is lit. If the switch DEF is pressed only once, the "error" LED is turned off and the error state is cleared. The "auto" switch A allows the user to manually turn on the controlled electrical devices or extend the "on" time for longer use. The "auto" mode takes effect if the power to the banks is already on and the user wants to extend the "on" time. The user can exit the "auto" mode by depressing the "next/resume" switch N/R which essentially returns control to the set-point program. If the equipment is left on in the "auto" mode, the auto mode function will be automatically turned off when the next "off" set-point is detected. The "next/resume" switch N/R is used in the program mode to step between the time set-up and the bank set-point set-up sequences. It is also used to exit from the auto mode and return to set-point program. The F1, F2, and F3 switches beneath the display are used in the program mode only.

DEFAULT SETTINGS

When shipped from the factory, the default on/off preset time for each bank of electrical outlets is 7:00 AM to 5:30 PM, Monday through Friday. The user only has to set the time and depress the "default" switch DEF twice to use the default settings. Should other times be desired, the user can program these by depressing the "program" switch P. The "program" switch P is used to set the time and the three bank on/off times or set-points. When more than one "start" set-point is set at the same time, the device will sequence the "turn-on" by delaying each electrical outlet bank fifteen-seconds to reduce power surge requirements.

PROGRAM MODE

Figure 6:
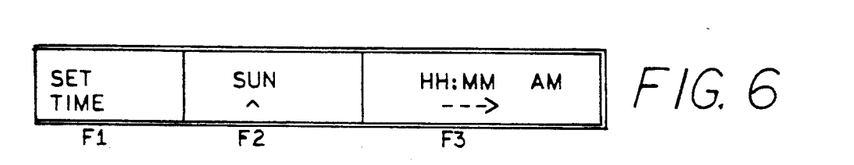
FIGS. 6–9 are illustrations of the LCD display at various stages of the programming mode.

Referring additionally to FIGS. 6-9, the programming sequences will be described. For proper operation of the device, the user must initially set the time, day of the week, the month, and the year using the F1, F2, and F3 switches (FIG. 6). The F1 switch allows the user to set or capture the time and continue on through the set-up sequence. The F2 switch allows the user to change the various values; i.e. toggle days on and off, hours 1 through 12 with wrap around, minutes 00 through 59 with wrap around, and AM/PM toggle. The F3 switch allows the user to move the cursor through the fields, such as, "days" field, "hours" field, "minutes" field, and "AM/PM" field with wrap around.

To enter the programming mode, the user depresses the "program switch" P and the "program" LED will be illuminated. The user then depresses the F1 switch and "set time" appears on the display.

After setting the current time, the user can do one of three things: (1) depress the F1 switch to set the time and go to "bank A start", (2) depress the "next/resume" switch N/R and go to "bank A start", or (3) depress the "program" switch P to set the time and exit the program mode.

Figure 7:
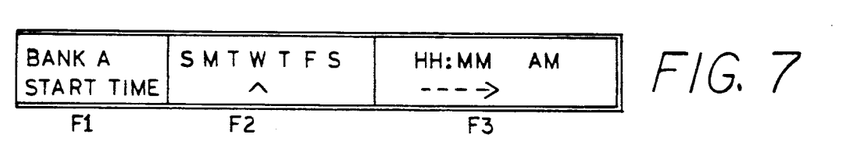

The set-up of the electrical outlet banks is described with reference to FIG. 7. This procedure will program the on/off set-points, days on, start time, and stop time for the electrical outlet banks A, B, and C. During the bank set-up mode, the respective bank LED will be on and the LCD display will appear as seen in FIG. 7.

The F1 switch allows the user to set or capture the start time and continue on to the stop time set-up. The F2 switch allows the user to change the various values in the cell in which the cursor currently resides; i.e. toggle days on and off, hours 1 through 12 with wrap around, minutes 00 through 59 with wrap around, and AM/PM toggle. The F3 switch allows the user to move the cursor through the fields: S M T W T F S, HH, MM, AM with wrap around.

After setting the start time for a bank, the user can do one of three things: (1) depress the F1 switch to set the start time and go to the "stop time" screen for this bank, (2) depress the "next/resume" switch N/R to set the start time and go to the next bank start time menu (skipping the stop time set-up for the preceding bank), or (3) depress the "program" switch P to set the current bank's start time and exit the program mode.

Figure 8:
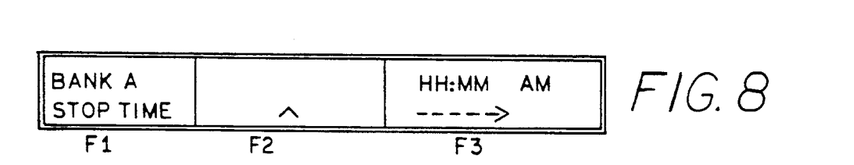

When continuing on to set the stop time, the LCD display will appear as seen in FIG. 8. The F1 switch allows the user to set the stop time and continue on to the next bank's start time set-up. The F2 switch allows the user to change the various values in the cell in which the cursor currently resides; i.e. toggle days on and off, hours 1 through 12 with wrap around, minutes 00 through 59 with wrap around, and AM/PM toggle. The F3 switch allows the user to move the cursor across the fields of the LCD display.

After setting the stop time for a particular bank, the user can do one of three things: (1) depress the F1 switch to set the stop time and go to the "start time" screen of the next bank, (2) depress the "next/resume" switch N/R to set the stop time and go to the "start time" menu for the next bank, or (3) depress the "program" switch P to set the stop time for the current bank and exit the program mode.

If the "stop time" menu is for bank C, the depression of the F1 switch, "next/resume" switch N/R, or "program" switch P, will accept the stop time and exit the program mode. The premature exit from the program mode by depression of the "program" switch P will accept all new start and stop times plus accept the unchanged start and stop times as the new on/off set-points.

In summary, the user can go to the next bank start menu at any time by depressing the "next/resume" switch. The device will accept what is on the screen or currently in its buffer if a stop sequence is skipped. The user can exit the set-up sequence anytime by depressing the "program" switch P. All data in the buffer and on the screen will be accepted and used by the device.

The stop time will always be later in the day than the start time. If the start and stop times are not set correctly, the error LCD will flash and an error tone will be generated. As each switch is depressed, a tone is generated to signify acceptance of the switch input.

NORMAL OPERATION MODE

Figure 9:
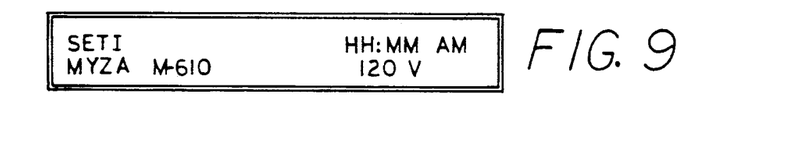

During normal operation (not program mode), the LCD display will appear as seen in FIG. 9, showing the hour, minute, and AM or PM and the amount of voltage being provided.

SELF TEST

The device can be self tested in the normal operation mode by depressing the F1 switch and the F3 switch at the same time. This will cause the device to turn each bank on for five-seconds and then off. More than one bank will not be on at any one time during the test. The LED's 13 on the front of the housing will be cycled one at a time. The LCD display 12 will display a test message, and after the self test is complete, the device will return to its previous state.

POWER-UP

On power-up, the programmable timed electrical power management device will read the set-points out of memory and time from the clock/calendar chip, and will then control the electrical outlet bank relays based on the set-points. Power is sequentially supplied to each electrical outlet bank, allowing the voltage to stabilize before turning on the next bank.

While this invention has been described fully and completely with special emphasis upon a preferred embodiment, it should be understood that within the scope of the appended claims the invention may be practiced otherwise than as specifically described herein.

I claim:

1. A programmable electrical power management device for connecting a plurality of electrical devices to a source of AC power and selectively controlling the application of electrical power to the electrical devices comprising;

a housing adapted for connection to a source of AC electrical power, a plurality of electrical outlets mounted on said housing for receiving the plugs of electrical devices and supplying AC power to the devices, a voltage surge suppression circuit within said housing and connected to said electrical outlets for suppressing unwanted voltage transients and surges occurring in the electrical power supplied to said electrical outlets, programmable control means in said housing connected with said voltage surge suppression circuit and said electrical outlets and responsive to user input for controlling the application of electrical power to said electrical outlets, timing means connected to said programmable control means for controlling date, time of day, and the length of time electrical power will be supplied to said electrical outlets, user input means on said housing connected with said programmable control means for allowing a user to input data for selectively controlling the application of electrical power to said electrical outlets, and visual display means connected to said programmable control means and said user input means for indicating the inputted data and visually displaying the voltage being supplied to said electrical outlets and the status of operation of said power management device.

2. A power management device according to claim 1 including;

a plurality of modular jacks mounted on said housing for receiving the modular plugs of electrical peripheral devices and connected to said voltage surge suppression circuit, and said voltage surge suppression circuit including circuitry for suppressing unwanted voltage transients and surges occurring in the power supplied through said modular jacks.

3. A power management device according to claim 1 in which;

said visual display means comprises a liquid crystal display screen for indicating the inputted data and status of operation of said power management device.

4. A power management device according to claim 1 in which;

said visual display means comprises a series of light emitting diodes for indicating the inputted data and status of operation of said power management device.

5. A power management device according to claim 1 including;

sound generating means connected to said programmable control means and said timing means for producing an audible signal indicating acceptance of the user inputted data and for warning the user prior to expiration of the length of time electrical power is supplied to one or more selected said electrical outlets.

6. A power management device according to claim 1 in which;

said programmable control means comprises microprocessor means including first memory storage means for storing data, second memory means having stored data processing programs for processing and manipulating data, a video display controller connected to said visual display means, input and output ports for receiving and transmitting data, and a central processing unit responsive to user input for controlling the operation of said first memory storage means, said second memory means, said input and output ports, and said video display controller, and said user input means comprises on or more keypad switches on said housing for allowing a user to input data for selectively controlling the application of electrical power to said electrical outlets.

7. A power management device according to claim 6 in which said voltage surge suppression circuit comprises;

a power supply inlet, a combination electrical filter and surge suppression circuit connected to said power supply inlet by the hot, common, and neutral electrical leads of the source of AC electrical power, the output of said combination electrical filter and surge suppressor circuit connected to said plurality of electrical outlets, and control switches connected in the hot electrical lead between said combination electrical filter and surge suppression circuit and said electrical outlets and controlled by said programmable control means.

8. A power management device according to claim 7 in which said combination electrical filter and surge suppression circuit comprises;

varistors connected in parallel across the hot, common, and ground leads to short circuit high frequency bursts to the common ground.

9. A power management device according to claim 8 including:

a plurality of modular jacks mounted on said housing for receiving the modular plugs of electrical peripheral devices and said combination electrical filter and surge suppression circuit, said modular jacks connected to the common ground through fuses, and said combination electrical filter and surge suppression circuit comprises varistors connected in parallel across the hot, common, and ground leads to suppress unwanted voltage transients and surges occurring in the power supplied through said modular jacks.

10. A power management device according to claim 7 in which said microprocessor has a control bus, a data bus, and an address bus each having an input/output port connected by leads to an electrical outlet to be controlled, and each electrical outlet to be controlled has an address which can be called up by placing the bit combination of the address on the address bus lead.

11. A power management device according to claim 10 including;

an oscillator for supplying timing signals required by said microprocessor, a voltage sensor connected between the power supply and said microprocessor control bus to monitor the power supply voltages and upon sensing low voltage to issue an interrupt signal through said control bus to said microprocessor upon power failure, and said microprocessor second memory means having stored data processing programs for initiating a shut-down sequence, whereby said microproccesor upon receipt of said interrupt signal initiates an orderly shut-down sequence of the electrical outlets controlled by it prior to complete power failure.

12. A power management device according to claim 11 in which;

said voltage sensor connected between the power supply and said microprocessor control bus to monitor the power supply voltages upon sensing start-up voltage to issue a start-up signal through said control bus to said microprocessor upon an initial power on condition, and said microprocessor second memory means having a stored data processing programs for initiating a start-up sequence, whereby said microproccesor upon receipt of said start-up signal initiates an orderly start-up sequence of the electrical outlets controlled by it such that power is sequentially supplied to each said electrical outlet controlled by said microprocessor and the voltage is allowed to stabilize after power is supplied to one of said electrical outlets and before supplying power to the next sequential said electrical outlet.

13. A power management device according to claim 11 including;
   a programmable timer/calendar IC chip connected to said control bus, data bus, and address bus, and
   an auxiliary back-up battery connected to said microprocessor and said timer/calendar to maintain back-up power to said microprocessor and timer/calendar when the main power is off or unplugged, and
   said timer/calendar IC chip providing the timing signals and keeping track of the date, month, and year.

14. A power management device according to claim 13 including;
   a buffer latch connected to said keypad switches and to said microprocessor control bus, data bus, and address bus,
   device drivers connected to said control switches and to said microprocessor control bus to affect turn-on of said control switches, and
   said microprocessor second memory means having stored data processing programs for reading, recording, and operating according to the inputted times in said buffer latch, whereby
   each said electrical outlet controlled by said control switches and said microprocessor can be selectively programmed by a user through said keypad switches to turn on and off at a different time of the day and different days of the week and the length of time power is supplied to each said controlled electrical outlet can be selectively programmed by the user.

15. A power management device according to claim 14 including;
   a second buffer latch and a light emitting diode matrix connected to said microprocessor control bus, data bus, and address bus, and
   said microprocessor is capable of writing to said second buffer latch to drive said light emitting diode matrix and give the user a visual readout of the status of the system.

16. A power management device according to claim 14 in which;
   said visual display means comprises a liquid crystal display screen connected to said microprocessor control bus, data bus, and address bus, and
   said microprocessor is capable of writing to said liquid crystal display to create visual characters corresponding to the status of operation of the system and to programming operations to facilitate programming of the device apparatus by the user.

17. A power management device according to claim 16 in which;
   an IC analog-to-digital converter is connected to the output of said combination filter and surge suppression circuit and to said microprocessor control bus for reading the AC voltage supplied to said controlled electrical outlets, and
   said microprocessor is capable of writing to said liquid crystal display to create visual characters corresponding to voltage being supplied to said controlled electrical outlets.

* * * * *